(12) United States Patent
Baker et al.

(10) Patent No.: US 9,261,418 B2
(45) Date of Patent: Feb. 16, 2016

(54) SYSTEMS AND METHODS FOR COMMON MODE SIGNAL CANCELLATION IN PRESS DETECTORS

(71) Applicant: Interlink Electronics, Inc., Camarillo, CA (US)

(72) Inventors: Jeffrey R. Baker, Thousand Oaks, CA (US); Edwin Keshesh Yousafian, Tujunga, CA (US); Declan Christopher Flannery, Venice, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 78 days.

(21) Appl. No.: 14/204,217

(22) Filed: Mar. 11, 2014

(65) Prior Publication Data

US 2014/0260679 A1 Sep. 18, 2014

Related U.S. Application Data

(60) Provisional application No. 61/777,231, filed on Mar. 12, 2013.

(51) Int. Cl.
*G01L 1/16* (2006.01)
*G01L 9/02* (2006.01)
*G01L 9/06* (2006.01)

(52) U.S. Cl.
CPC ... *G01L 1/16* (2013.01); *G01L 9/02* (2013.01); *G01L 9/065* (2013.01)

(58) Field of Classification Search
CPC ............ G01L 19/02; G01L 1/16; G01L 9/065
USPC ................................ 73/777, 862.045, 862.68
See application file for complete search history.

(56) References Cited

U.S. PATENT DOCUMENTS

| 4,906,840 | A * | 3/1990 | Zdeblick et al. .................. 850/1 |
| 5,856,644 | A * | 1/1999 | Burgess ...................... 200/61.43 |
| 2007/0236107 | A1* | 10/2007 | Maruyama et al. ........... 310/366 |
| 2008/0224566 | A1* | 9/2008 | Bharti et al. .................. 310/311 |
| 2013/0205582 | A1* | 8/2013 | Singh et al. .................. 29/602.1 |

OTHER PUBLICATIONS

"Piezo Film Sensors, Technical Manual" Measurement Specialties, Inc, P/N 1005663-1 REV E Mar. 25, 2008.

* cited by examiner

*Primary Examiner* — Max Noori
(74) *Attorney, Agent, or Firm* — Troutman Sanders LLP (57) ABSTRACT

Certain implementations of the disclosed technology may include systems, methods, and apparatus for common mode signal cancellation in force change detectors. An example embodiment of the disclosed technology includes a press sensor element configured to reduce or eliminate thermally induced signals. The sensor element includes a piezoelectric layer that includes a first surface in communication with a first layer. The first layer includes a first conductive region. The piezoelectric layer includes a second surface in communication with a second layer. The second layer includes a second conductive region, a third conductive region, and a non-conductive void region separating the second conductive region and the third conductive region. The second and third conductive regions are configured to substantially reduce a thermally-induced voltage change between two or more of the first, second and third conductive regions responsive to a corresponding temperature change of at least a portion of the piezoelectric layer.

20 Claims, 7 Drawing Sheets

SYSTEMS AND METHODS FOR COMMON MODE SIGNAL CANCELLATION IN PRESS DETECTORS

RELATED APPLICATIONS

This application is related to and provisional application Ser. No. 61/777,231, filed on Mar. 12, 2013, entitled: "Pyroelectric Common Mode Cancellation," the contents of which are hereby incorporated by reference in their entirety.

BACKGROUND

Human-machine interfaces often utilize press detectors that can receive touch input for interaction with digital content, machine controls etc. Press detectors can be configured for use with many types of applications and surfaces including, for example, car dashboard controls, touch/gesture input for portable computing devices, outdoor or harsh environment control buttons, etc. Such press detectors enable tactile human-machine interaction in a natural and preferred way.

Piezoelectric impact detectors formed from polymeric materials such as polyvinylidene fluoride (PVDF) offer cost effective and high performance detection of momentary forces, such as the push of a button or a surface, the closure of a door or latch, or the passing of a person or vehicle. These thermoplastic fluropolymer materials can be made very thin and are typically resistant to solvents, acids, and bases. PVDF is a material that works very well in the construction of surfaces or thin sensor modules for touch and press detection. However, many piezoelectric materials such as PVDF have the disadvantage that they also respond to temperature changes, often with pyroelectric coefficients that rival their piezo coefficients. Thus, touch sensors made with materials having a large pyroelectric coefficient can produce a false signal due to a temperature change, such as for example, in a vehicle when it moves from an air-conditioned environment into extreme weather, or between shadows and hot sun.

SUMMARY

Some or all of the above needs may be addressed by certain implementations of the disclosed technology.

An example embodiment of the disclosed technology includes a press sensor element configured to reduce or eliminate thermally induced signals. The sensor element includes a piezoelectric layer that includes a first surface in communication with a first layer. The first layer includes a first conductive region. The piezoelectric layer includes a second surface in communication with a second layer. The second layer includes a second conductive region, a third conductive region, and a non-conductive void region separating the second conductive region and the third conductive region. According to an example implementation of the disclosed technology, the second and third conductive regions are configured to substantially reduce a thermally-induced voltage change between two or more of the first, second and third conductive regions responsive to a corresponding temperature change of at least a portion of the piezoelectric layer.

According to another example implementation, a system is provided. The system includes a force-spreading layer, a mask layer in communication with at least a portion of the force spreading layer, and a piezoelectric element in communication with at least a portion of the mask layer. The piezoelectric element includes a piezoelectric layer that further includes a first surface in communication with a first layer. The first layer includes a first conductive region. The piezoelectric layer includes a second surface in communication with a second layer. The second layer includes a second conductive region, a third conductive region, and a non-conductive void region separating the second conductive region and the third conductive region. According to an example implementation of the disclosed technology, the second and third conductive regions are configured to substantially reduce a thermally-induced voltage change between two or more of the first, second and third conductive regions responsive to a corresponding temperature change of at least a portion of the piezoelectric layer.

According to another example implementation, a method is provided for reducing thermally-induced responses associated with a press detector. The method includes sensing a force-induced or pressure-induced voltage differential with a sensor element. The sensor element includes a piezoelectric layer that includes a first surface in communication with a first layer. The first layer includes a first conductive region. The piezoelectric layer includes a second surface in communication with a second layer. The second layer includes a second conductive region, a third conductive region, and a non-conductive void region separating the second conductive region and the third conductive region. According to an example implementation of the disclosed technology, the second and third conductive regions are configured to substantially reduce a thermally-induced voltage change between two or more of the first, second and third conductive regions responsive to a corresponding temperature change of at least a portion of the piezoelectric layer.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully hereinafter with reference to the accompanying drawings. This disclosed technology may, however, be embodied in many different forms and should not be construed as limited to the implementations set forth herein.

Example embodiments of the disclosed technology include an improved mechanical and/or electrical solution for cancellation of a pyroelectric signal that can be generated, for example, due to thermal changes in a piezoelectric-based force/pressure detector. Embodiments disclosed herein may further enable the construction of smaller and more cost-effective force/pressure detection devices, for example, by reducing or eliminating the need for adding thermal mass (or thermal isolation means) to the device to reduce the pyroelectric response due to temperature changes experienced by the device.

According to example implementations of the disclosed technology, and as will be explained in detail with reference to the accompanying figures, a force and/or pressure sensing element may be constructed to allow detection of a force/pressure signal while reducing a thermally-induced, common-mode electrical response associated with a piezoelectric layer. Example embodiments may utilize various arrangements of conducting regions adjacent to the piezoelectric layer to achieve this feature. The reader is encouraged to study the detailed description related to at least FIG. 4 to understand how embodiments of the disclosed technology may reduce the thermally-induced, common-mode electrical response associated with a piezoelectric layer.

The terms "press detector" and "force and/or pressure sensing element" as used herein are intended to encompass sensors and/or sensor elements that can respond to, detect, and/or otherwise measure force and/or pressure exerted on a portion of the detector or element.

Certain example embodiments of the press detector may be configured to sense or detect a physical contact touch or a touch gesture, for example, from a human finger, stylus or similar object. Yet other example embodiments of the press detector may be configured to sense or detect impact, pressure variations, and/or pressure vibrations associated with a physical touch or a touch gesture.

Certain example embodiments of the press detector, as disclosed herein, may be configured to detect or measure sound pressure variations. For example, certain embodiments may be responsive to audible or inaudible sound or noise energy (i.e., sound pressure) of various frequency (f) and amplitude, with or without relying on an object to physically touch the press detector. Certain example implementations may be responsive to one or more audio frequency ranges, for example, subsonic frequencies ($f<\sim50$ Hz), audible ($\sim50$ Hz$<f<\sim20$ KHz), and/or ultrasonic frequencies ($f>\sim20$ Khz).

A common piezoelectric transducer material is polyvinylidenefluoride (PVDF) and its variants. The uses of PVDF film or other piezoelectric or electret materials as sensors are many and varied. PVDF polymers are available from several sources and can be extruded into films or coated onto other materials such as Silicon wafers to become part of sensors and other devices, such as MEMs.

Many common uses of PVDF material take advantage of the piezoelectric response to stretching or compression of the piezoelectric layer in order to form various impact, vibration, or touch detectors. One common use of piezoelectric material takes advantage of the pyroelectric effect to detect the heat of persons within view of the sensor. In such thermal sensors, the piezoelectric response is actually unwanted, and is typically minimized by using two piezoelectric sensor elements, both of which suffer the same mechanical disturbances but only one of which is exposed to incident thermal radiation. The two elements may be wired in anti-series, so their common piezoelectric response cancels.

In contrast with a thermal detector, and to take advantage of the piezoelectric response (i.e., to minimize the thermal response), a piezoelectric element may segmented, according to certain example embodiments, to create a compression detector that is minimally responsive to temperature changes. One possible solution, as mentioned above, is to add thermal inertia. For example, if bonded to an object with appreciable mass and specific heat, the temperature changes of a sensor element can be slowed down to a manageable rate. Another possible solution is to embed the sensor in a thermally protected space, insulated from external changes. However, both of these solutions typically increase cost, add bulk, and limit design freedom.

The piezoelectric element, as disclosed herein, is defined by areas or sections: one that will receive thermal disturbances and is insulated from mechanical stimuli, and another which will receive both thermal and mechanical stimuli. The two sections are then wired in series, such that their pyroelectric signals cancel. Mechanical stimuli to the second section generates a piezoelectric signal that is not cancelled by a corresponding signal from the second section.

In an example implementation of the disclosed technology, the isolation of the first section from mechanical compression signals may be accomplished with the use of a substantially rigid force spreading layer for receiving external forces, arrayed over a patterned mask layer that distributes forces onto the piezo element. The mask layer may be defined by solid areas where force is to be transmitted into the piezo element, and holes where it is not. In certain embodiments, force may be concentrated and transmitted into piezo element through the solid areas, and may be prevented from compressing the piezo element in areas of holes In an example implementation, the mask layer may affect the flow of heat from the force spreading layer into the piezo element by introducing differences in heat transfer between solid and void areas. For example depending on the emissivity of the force spreading layer, thermal radiation may be more efficiently coupled into the piezo element through voids in the mask layer. Similarly, depending on the thermal conductivity, heat may be conducted more poorly through the solid areas of the mask layer. According to an example implementation of the disclosed technology, these effects can be compensated by adjusting the relative areas of the sections of the piezo element until their pyroelectric signals are equal.

Various techniques, arrangements, configurations, etc., of press detector embodiments and associated components, as disclosed herein, and will now be further described with reference to the accompanying figures.

Figure 1:
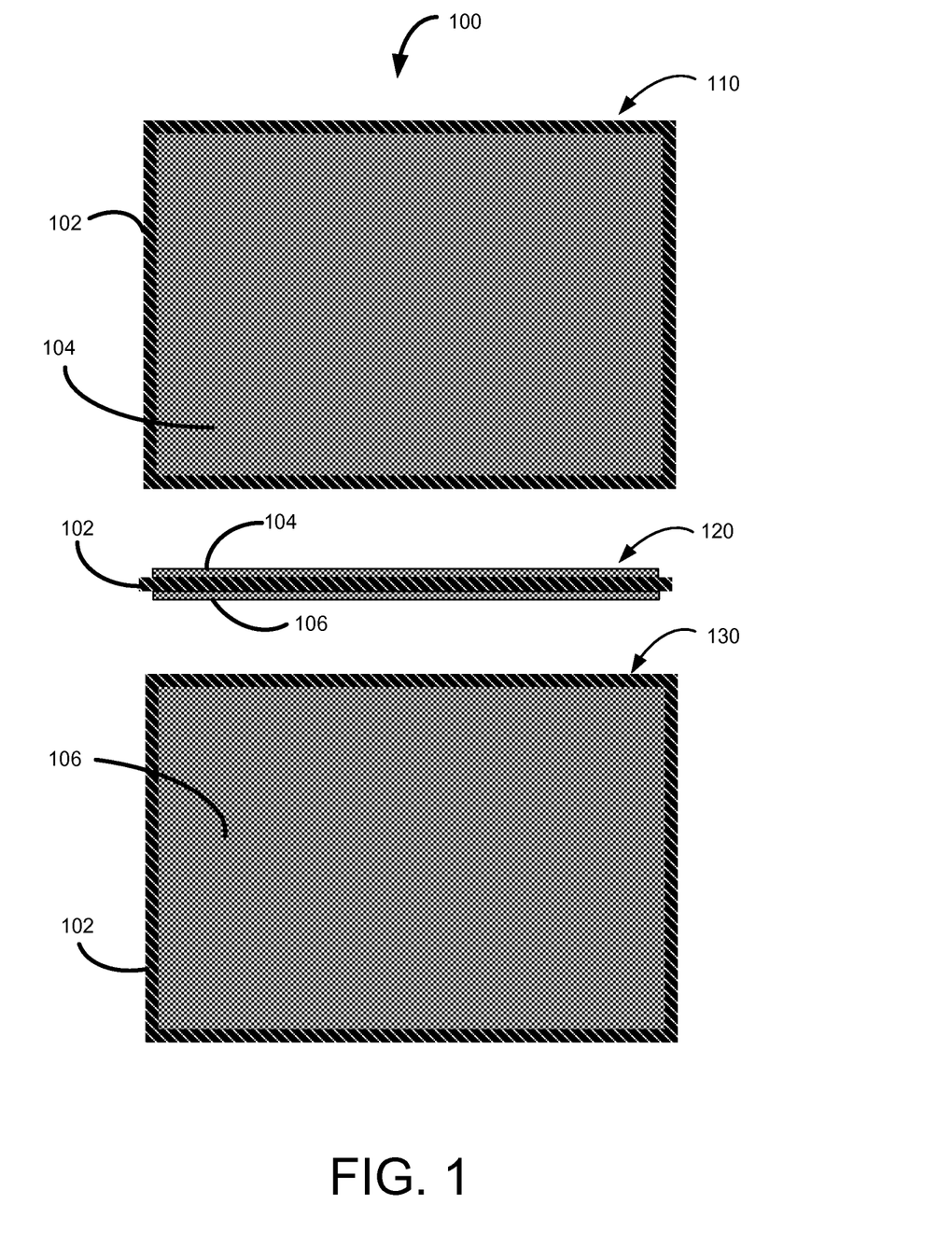
FIG. 1 depicts a top view 110, cross-sectional side view 120, and bottom view 130 of a typical piezoelectric sensor element 100.

FIG. 1 depicts a top view 110, cross-sectional side view 120, and bottom view 130 of a typical piezoelectric sensor element 100. It should be noted that FIG. 1 shows a typical "Prior Art" device that is not necessarily configured to reduce the thermal response, but is shown for reference and for comparison purposes. However, example embodiments of the disclosed technology that are configured to reduce the thermal response will be described below with reference to FIGS. 2-7.

The typical piezoelectric sensor element 100 includes a piezoelectric layer 102 that may be a PVDF film, such as manufactured by Measurement Specialties, Inc. The piezoelectric layer 102 may include electrodes 104 106 on both sides that are formed, for example, by deposition of a conductive layer. The deposition could be a vacuum deposited metal, a screen printed conductive polymer thick film, carbon nanotube (CNT) printable ink, or other method known in the art. The sensitive area of the film is typically defined by the area of overlap of metallization of the two sides.

Figure 2:
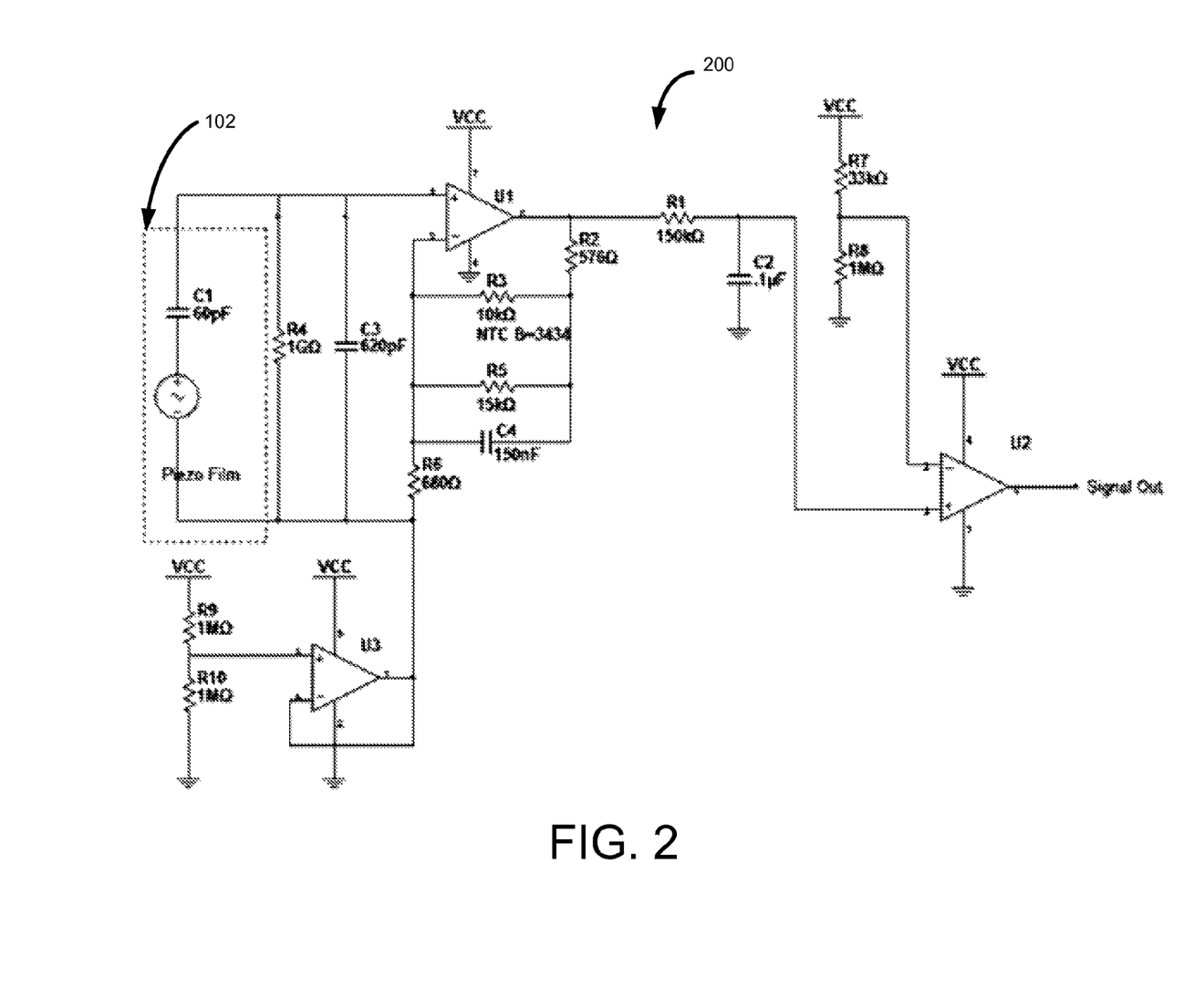
FIG. 2 illustrates an example piezoelectric sensor measurement circuit 200, as is known in the art.

FIG. 2 illustrates an example piezoelectric sensor measurement circuit 200, as is known in the art. The piezoelectric element (for example, the piezoelectric sensor element 100 of FIG. 1) may be represented on the far left portion of the circuit 200 as an AC signal in series with a small capacitance. In a typical arrangement, the piezoelectric element may be placed in parallel with high value resistor R4 in order to convert charge to voltage while achieving response at low frequencies. The additional parallel capacitance C3 may be utilized to enhance the low frequency response. C3 may have the side effect of reducing signal strength, which may be compensated in certain embodiments by increasing the gain of the first stage amplifier.

The signal generated by interaction with the piezoelectric element may be amplified by a first stage op amp U1. The gain of this traditional non-inverting configuration is set by resistors R2, R3, R5, and R6. Resistor R3 is a negative temperature coefficient thermistor, used here to increase gain at lower temperatures. This effectively compensates for the reduced sensitivity of the piezoelectric element at low temperatures. Capacitor C4, and also the low pass RC filter provided by R1 and C2, provide signal smoothing and rejection of 60 Hz noise.

The reference voltage for amplifier stage U1 is set by op amp U3, which is configured as follower in order to supply Vcc/2. A positive signal in response to compression of the piezo film will cause the output of this first stage amplifier to rise above Vcc/2. Relaxation of the compression causes the output to fall below Vcc/2.

An analog output of this first stage amplifier could be used by a measurement circuit directly. Alternately, a second stage could be provided to create a digital signal. Here op amp U2 is configured as a comparator that will provide a high signal whenever the first stage amplifier output rises near Vcc. This digital signal could then be connected to an interrupt input to a host circuit, or used to drive a transistor for switching another signal.

Figure 3:
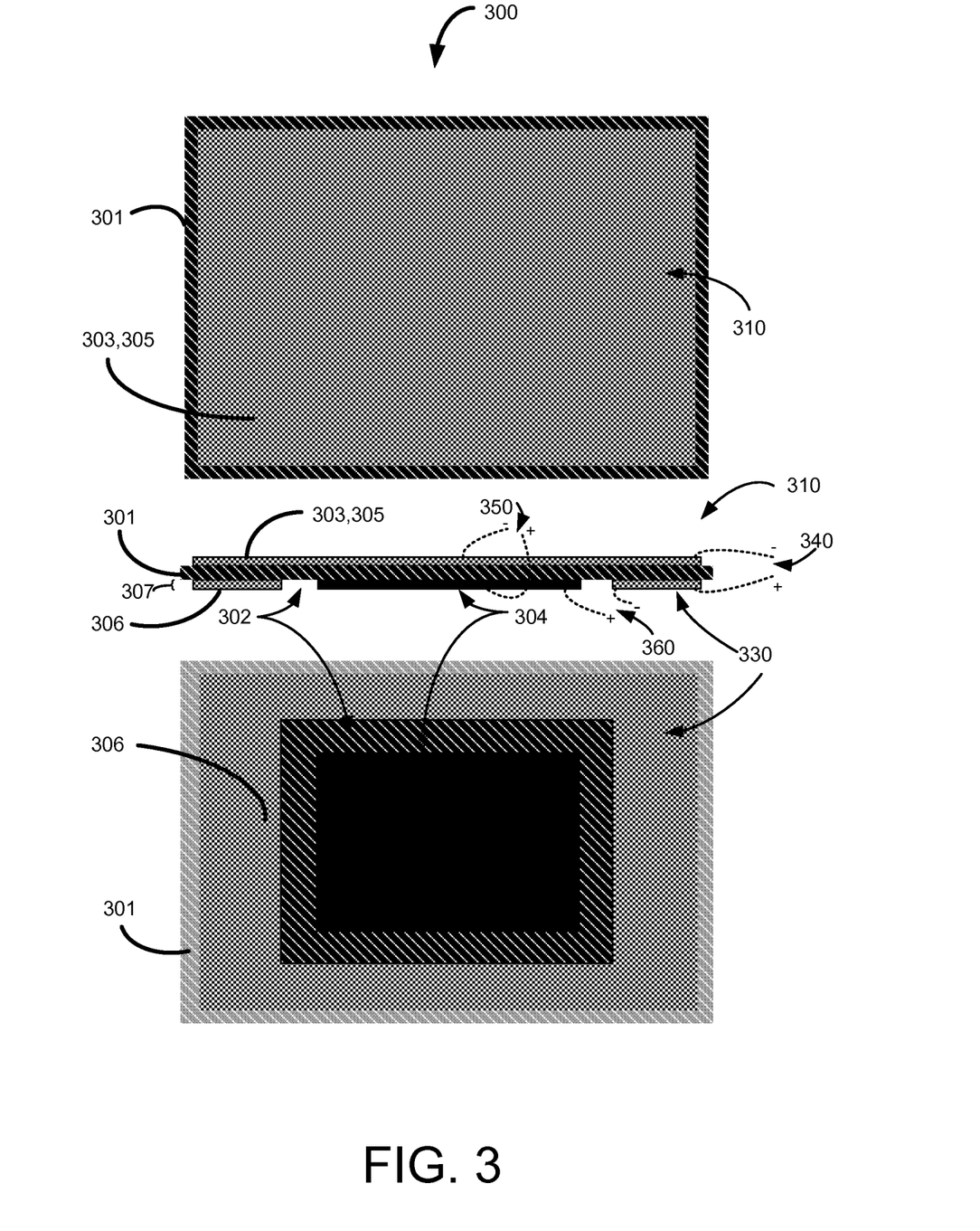
FIG. 3 depicts a top view (upper figure), cross-sectional side view (middle figure), and bottom view (lower figure) of a piezoelectric sensor element 300 according to an example implementation of the disclosed technology.

FIG. 3 depicts a top view (upper figure), cross-sectional side view (middle figure), and bottom view (lower figure) of a piezoelectric sensor element 300 according to an example implementation of the disclosed technology. In an example implementation, the piezoelectric sensor element 300 includes a piezoelectric layer 301 having a first surface 310 and a second surface 330. In an example implementation, the first surface 310 of the piezoelectric layer 301 may be in communication with a first layer 303 that may include a first conductive region 305. In one example implementation, the first layer 303 may be defined by a conductive region 305 covering most of the first surface 310 of the piezoelectric layer 301. In other example implementations, the first conductive region 305 may cover a portion of the first surface 310 of the piezoelectric layer 30. In certain example implementations, the conductive region 305 may include a conductive organic material, a conductive polymer, a metal, a transparent conductive metal-oxide, graphene, carbon nanotubes (CNT), metal nanorods, metal particles, metal oxide particles, or a mixture thereof.

According to an example implementation of the disclosed technology, the second surface 330 of the of the piezoelectric layer 301 may be in communication with a second layer 307. In an example implementation, the second layer may include a second conductive region 304, a third conductive region 306, and a non-conductive void region 302 separating the second conductive region 304 and a third conductive region 306. In certain example implementations, the conductive regions 304 306 may include a conductive organic material, a conductive polymer, a metal, a transparent conductive metal-oxide, graphene, carbon nanotubes (CNT), metal nanorods, metal particles, metal oxide particles, or a mixture thereof. According to certain example implementations of the disclosed technology, the various conductive layers may be defined via printing of conductive polymer thick film inks, printable inks including carbon nanotubes (CNT), evaporation of a metallic film through a mask, or other methods known in the art.

In accordance with an example implementation of the disclosed technology, the second layer 307 may be segmented into two or more conductive regions 306 304 separated by one or more non-conductive void region 302. In an example implementation, one of the conductive regions 306 304 may be arranged or configured to respond primarily to thermal stimuli, while the other of conductive regions 306 304 may be arranged or configured be responsive to both mechanical force and thermal stimuli.

FIG. 3 also depicts example response signal measurement leads corresponding to pairs of conducting regions 304 305 306. For example, measurement leads may be connected to the first conductive region 305, the second conductive region 304, and the third conductive region 306 to monitor the charge and/or voltage responses 340, 350, 360, between respective pairs of conductive regions 310-330, 310-304, 330-304.

Not shown in FIG. 3, but are considered within the scope of the disclosed technology, are other possible connection methods besides the general illustration of the example signal measurement leads that are shown in FIG. 3. For example, other measurement and/or signal leads may be configured as one or more tails (or pigtails) extending from one or more edges of the piezoelectric sensor element 300, where traces from the desired conductive regions (for example, from the second 304 and third 306 conductive regions) may be routed along the tail. In one example implementation, the tip of the tail could be inserted into a connector. In another example implementation, a connector could be attached to the tail for mating with another connector. In another example implementation, measurement and/or signal leads may be crimped-on, riveted to, or soldered to terminals in contact with the various conductive regions. In certain example implementations, the conductive traces associated with measurement and/or signal leads may extend down the tail on opposite faces of the tail, each emanating from the conductive regions on one face of the element. Alternately, either on the main body of the piezoelectric sensor element 300 or on the tail, the signals from one side of the piezoelectric sensor element 300 may be brought to the other side of the element using a conductive via, similar to conductive vias well known in printed circuit board construction. In an example implementation, the tail may be inserted into a connector that has contact elements only for traces facing a single direction.

Many other forms of connection for accessing response signals from the piezoelectric sensor element 300 may be utilized according to example implementations of the disclosed technology. For example, conductors made from conductive epoxy, solid or patterned conductive pressure sensitive adhesive films, and/or physical contact with signal traces may be utilized since the signal from the piezoelectric sensor element 300 is fundamentally a dynamic signal. According to an example implementation of the disclosed technology, an AC signal may be coupled from the piezoelectric sensor element 300 through a thin dielectric layer.

To accommodate complex geometries, mounting holes, or other constraints, the piezoelectric sensor element 300 and associated layers and regions may be further segmented into any number of sections, and will be discussed below with reference to FIG. 6. However each section may be categorized as responsive primarily to thermal stimuli or responsive to both mechanical and thermal stimuli. For simplicity the following discussion will assume the two sections shown in FIG. 3.

Figure 4:
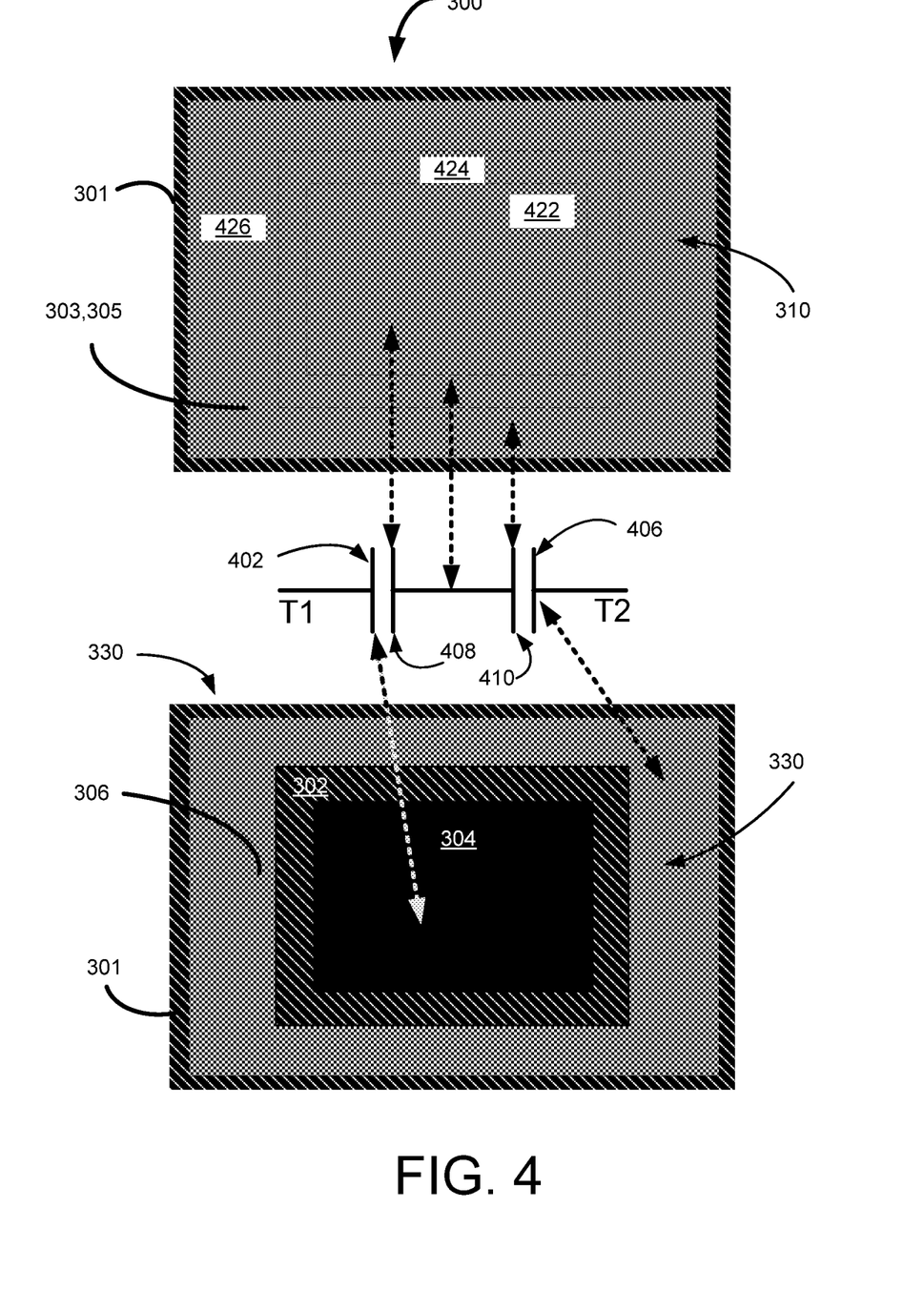
FIG. 4 illustrates capacitive elements that are schematically equivalent to layers and regions of a piezoelectric sensor element 300, according to an example implementation of the disclosed technology.

FIG. 4 illustrates capacitive elements that are schematically equivalent to layers and regions of a piezoelectric sensor element 300, according to an example implementation of the disclosed technology. FIG. 4 and the associated description provides information that may enable an understanding of how to make and use certain embodiments of disclosed technology for reducing a thermally-induced, common-mode electrical response associated with a piezoelectric layer As known to those having skill in the art, piezoelectric film elements have an associated polarity such that when the film is compressed, a charge separation is generated that results in a voltage potential difference between one side of the film and the other side. Certain aspects of the disclosed technology may be utilized regardless of which polarity is chosen for the faces. However for clarity of description, it will presumed that the polarity of the piezoelectric element 301 is chosen to provide a positive charge on the (segmented) second surface 330 during compression relative to the charge presented at the first surface 310 of the piezoelectric layer 301. With this choice, mechanical stimuli (for example, compression) may cause the outer region (for example, the third conductive region 306 region) of the second surface 330 to become more positive with respect to the first conductive region 305 that is associated with the first layer 303.

In accordance with an example implementation of the disclosed technology, two or more regions 304 305 306 of the piezoelectric sensor element 300 may be connected in a series combination that may serve to cancel signals that originate commonly in both regions.

As depicted in FIG. 4, the piezoelectric element 300 may be represented by a first capacitor having a first capacitive plate 402 defined by the second conductive region 304 on the segmented side (second surface 330) of the piezoelectric layer 301, and a corresponding second capacitive plate 408 defined approximately by a first conductive area 422 of the first layer 310 that is opposite the second conductive region 304 of the second layer 307 (or second surface 330).

Also depicted in FIG. 4, and according to an example implementation, is a second capacitor represented by a third capacitive plate 410 that is defined approximately by a second conductive area 426 of the first surface 310 that is opposite the third conductive region 306 of the second layer 307 (or second surface 330). Finally, a fourth capacitive plate 406 of the second capacitor may be defined by the third conductive region 306 of the second layer 307 (or second surface). The common conductor, as depicted connecting the first and second capacitors in series, may represent and be defined by a third conductive area 424 of the first surface 310 that is opposite the non-conductive void region 302 of the second layer 307 (or second surface 330).

According to an example implementation of the disclosed technology, the innermost plates 408 410 of the two capacitors may be considered to be a common plate, approximately defined by the first surface 310 and having a single zone of conductivity (for example, metallization) and arbitrarily chosen to be the negative face of the piezoelectric element assembly 300. In one example implementation, these innermost capacitor plates are not connected to a terminal per se of the series combination; there is no connection to these plates, just as there is no separately defined discreet "connections" joining the corresponding faces (for example, connecting the first conductive area 422, second conductive area 426, and the third conductive area 424) as the first layer 303 may be a continuous conductive layer.

According to one example implementation, the terminal T1 of the series combination, and as shown in FIG. 4, may correspond to a primarily thermal responsive region of the second surface 330, while terminal T2 may correspond primarily to the mechanical responsive region second surface 330 (depending on a configuration of a mask as will be discussed with reference to FIG. 5 and FIG. 6 below). For example, by applying a mechanical stimulus, recalling that a mask layer may be utilized to concentrate any pressure stimulus only to the outer ring region (i.e., the third conductive region 306) may cause the outer ring of the second surface 330 to become positive. In the capacitor model, as described above, this area corresponds to T2. In an example implementation, the positive charge on T2 may cause a corresponding negative charge to appear on T1. According to an example implementation, an amplifier connected to these terminals T1 T2 may be utilized to detect a signal proportional to the magnitude of the stimulus.

However, subjecting the entire piezoelectric layer 301 to a temperature change may cause both sections associated with the piezoelectric layer 301 (i.e., the second conductive region 304 and the third conductive region 306) to generate a like charge on the corresponding conductive areas 422 426 of the first surface 310. Thus, in the capacitor model, both T1 and T2 may see this like charge. According to an example implementation (and depending on factors such as the area proportion of the second and third conductive regions 304 306) an amplifier connected to the T1 and T2 terminals may register little or no thermally-induced voltage difference, and such thermally-generated signals would tend to cancel as a result of this novel arrangement.

With regard to making electrical connections to the various conductive regions (for example to conductive regions 304 306) for routing signals to be sensed (for example, by circuit 200), certain electrodes and/or conductive contacts may made to the two conductive regions 304 306 on the (segmented) second surface 330 of the piezoelectric element assembly 300. In one example implementation the connection could be made by routing the traces from these sections down a connecting tail (not shown). Alternately the connection could be made by pressing the two conductive sections against conductive pads on a printed circuit board. Because the sensor is intended to sense compression, the actuation of the sensor may serve to enhance the contact between the conductive region of the piezo element and the pads on the circuit board. Or for a more robust connection, a conductive pressure sensitive adhesive film, such as AR8001 from Adhesives Research, Inc., could be used to adhere the two conductive segments against a PCB.

Figure 5:
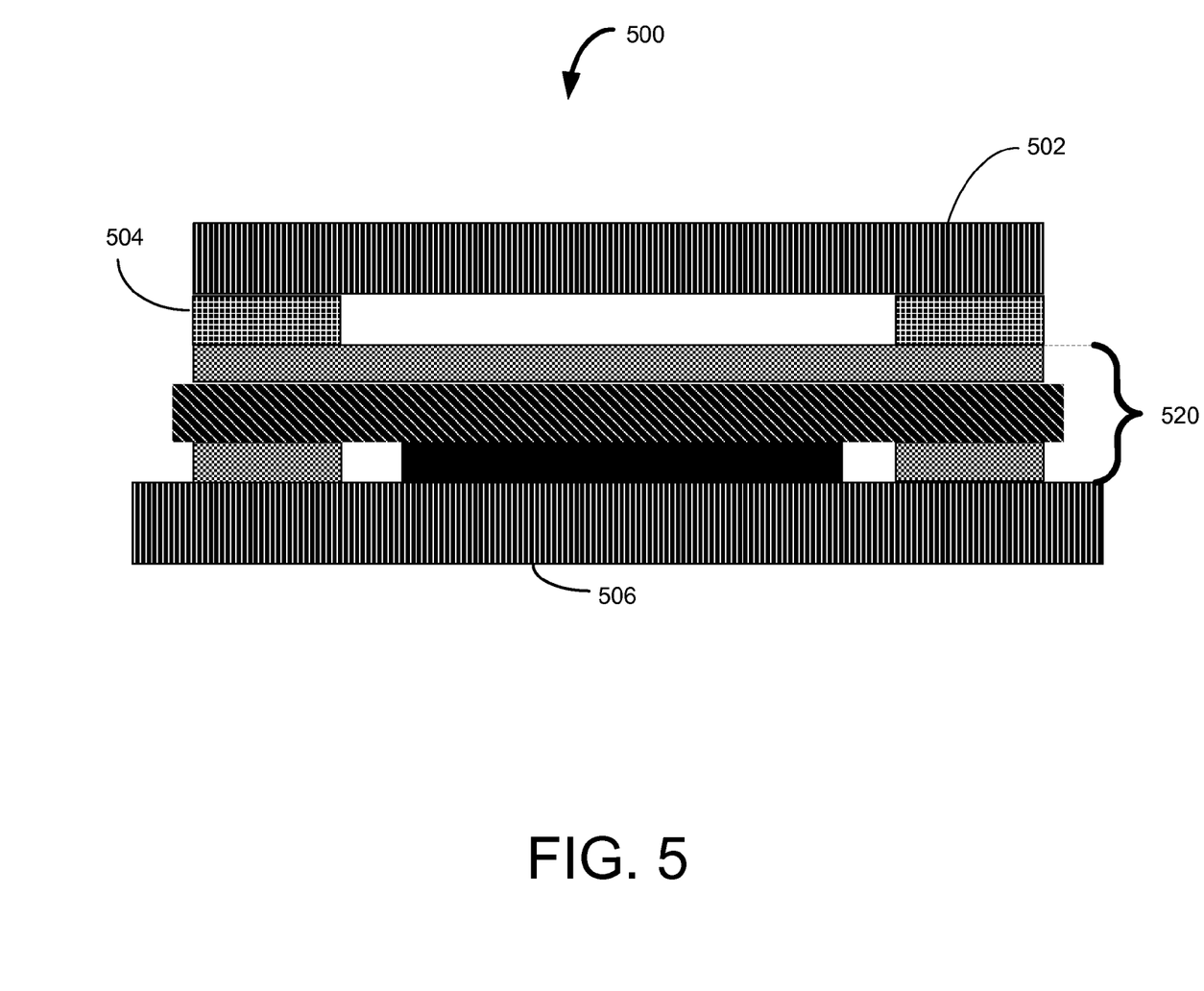
FIG. 5 is a cross-sectional side view diagram illustrating a sensor system 500 embodiment, according to an example implementation of the disclosed technology.

FIG. 5 depicts a force spreading layer 502 and a mask layer 504 on top of the segmented piezo element 520. According to an example implementation of the disclosed technology, applied forces may be concentrated onto a single section of the piezoelectric layer 301 by means of the mask 504 and force spreading 502 layers. FIG. 5 includes a cross section view through a piezoelectric element assembly embodiment 500 indicating a piezo element 520 having a solid top conductive region (such as the first conductive region 305 of FIGS. 3 and 4) and a two-section bottom conductive region (such as the second conductive region 304 and the third conductive region 306 separated by the non-conductive void region 302, as shown in FIGS. 3 and 4), where the said top and bottom regions are separated by a piezoelectric film (for example, the piezoelectric layer 301 of FIGS. 3 and 4). The top, bottom, and piezoelectric layers may be collectively denoted as a piezo element 520.

In a first example implementation, an outer region of the piezo element 520 may be configured as a mechanically receptive region, while the inner region may be isolated from mechanical stimuli. This configuration may be preferred for certain applications, however, it should be readily understood that in other example embodiments, the inner region may be exposed as the mechanically receptive region, while the outer region be isolated from mechanical stimuli.

In the first example implementation as described above, where the outer region is configured to be receptive to mechanical stimuli, a mask layer 504 may adhere to the outer perimeter of the piezo element 520, which may provide more mechanical stability than the contrary choice. Additionally, by adhering the mask layer 504 to the perimeter of the piezo element 520, the thermally-responsive region may be at least partially isolated from extraneous air currents, radiation, etc.

According to an example implementation the mask layer 504 may define the area over which force is transmitted into the piezo element. Where the mask layer 504 is solid, force is transmitted. Where the mask layer 504 has a void, no force is transmitted. According to an example implementation, the solid areas of the mask layer 504 may be arranged over the region of the piezo element 520 designated to receive both thermal and mechanical stimuli, and voids in the mask layer 504 may be arranged over those regions of the piezo element designated to receive only thermal stimuli.

In an example implementation, the mask layer 504 could be a pressure sensitive adhesive (PSA), such as part numbers 7962 from 3M or 4972 from Tesa. The mask layer 504 may also contain a polyester or other polymer film, or be a composite of several materials. These filmic materials may be conveniently patterned by several methods, including die cutting and laser cutting. Alternately the mask layer 504 may be made of any material that is formable to have voids.

In certain example implementations of the disclosed technology, the mask layer 504 may be substantially incompressible, at least such that the range of expected forces on the mask layer 504 will not alter its masking performance. Furthermore, in certain embodiments, the mask layer 504 should not translate compressive forces into stretch forces, such as a compressible foam may do.

According to various example implementations of the disclosed technology, the mask layer 504 may be of any thickness that supports the masking action. Material and thickness choice for the mask layer 504 may consider thermal properties because ideally the solid and void areas should transmit thermal changes to the element as similarly as possible.

FIG. 5 shows a force spreading layer 502 that may be provided to concentrate forces onto the solid areas of the mask layer 504, and to prevent forces applied over open areas of the mask layer 504 from reaching the piezo element 520. The force spreading layer 502 may be rigid enough not to deform downward into the void regions of the mask layer 504 and cause undesirable mechanical stimulus of the thermal-only region, even if an external force stimulus is concentrated over a void.

According to certain implementation, the force spreading layer 502 may be made from any formable rigid material. Ideally, the force spreading layer 502 enhances the similarity of heat transmission into the two regions of the piezo element 520. For example, the force spreading layer 502 may be metallic with large specific heat and thermal conductivity. Such material may be utilized to spatially homogenize heat transfer and slow any fast thermal transients.

The force spreading layer 502, mask layer 504, and piezo element 520 form a vertical stack as shown in FIG. 5. In an example implementation, this stack may rest upon a rigid base 506 that forms a bottom force spreader. The rigid base 506 may be a circuit board to which the piezo element 520 is electrically connected by mere contact or by conductive adhesive, or may be some other surface if the connection method is otherwise arranged.

If the connection method does not require the segmented electrodes to make contact with the rigid base 506, then in certain embodiments, the relative positions of the piezo element 520 and mask layer 504 can be switched. The mask layer 504, for example, may be patterned and aligned as described above, but may be positioned between the piezo element 520 and the bottom rigid base 506. Then the force spreading layer 502 may apply forces across the entire top of the piezo element 520, but reaction forces from the rigid base 506 may be felt only where the mask layer 504 is solid.

According to an example implementation, a design goal is to have both segments of the piezo element 520 respond identically to thermal transients. Because the solid and void areas of the mask will transfer heat differently, and because the thermal-only segment of the piezo element may see direct thermal radiation from the force spreading layer, some measures may be taken to meet this goal. One measure is to adjust the relative sizes of the two piezo element segments. For example the relative area ratios of the second conductive region 304 and the third conductive region 306 (as shown in FIGS. 3 and 4) may be configured accordingly.

Figure 6:
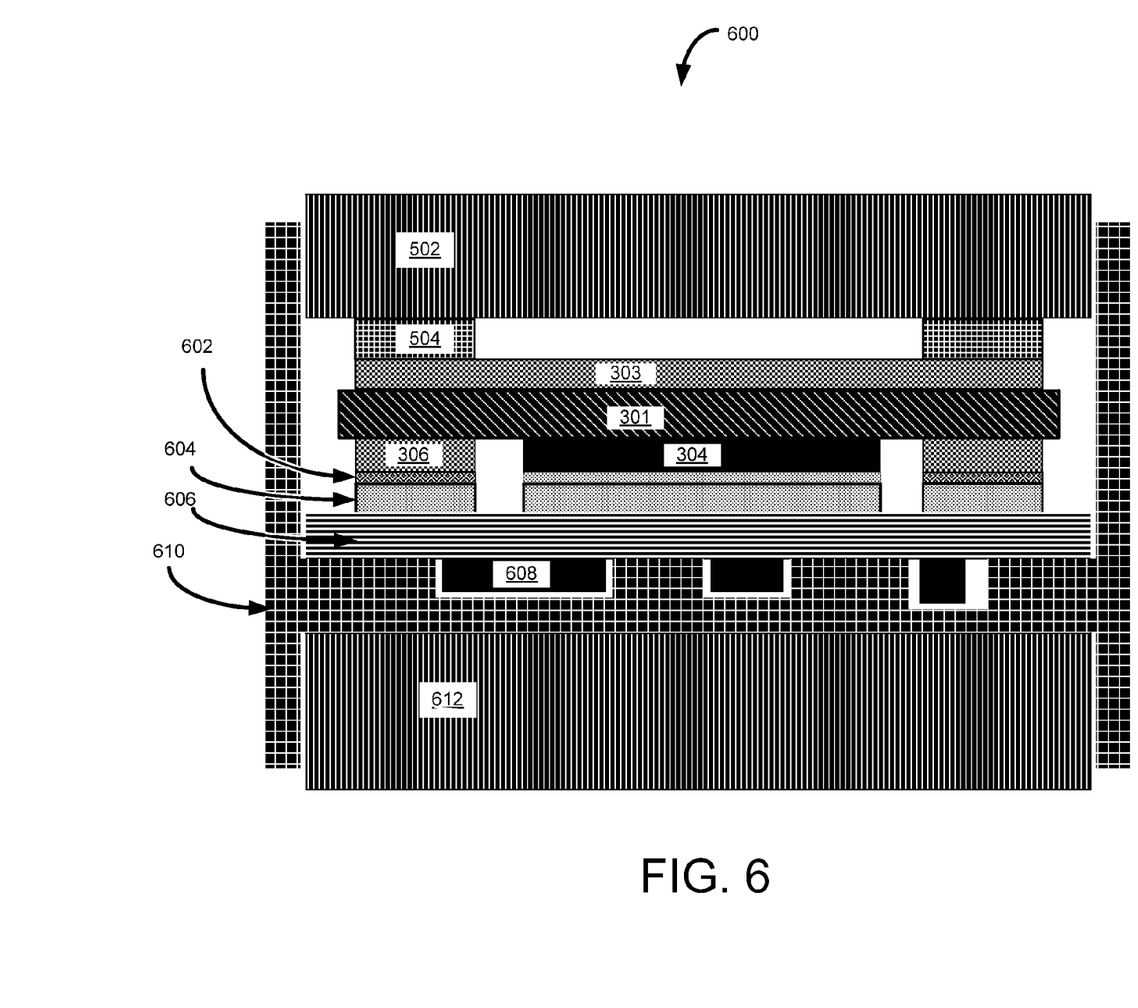
FIG. 6 is a cross-sectional side view diagram illustrating another sensor system 600 embodiment, according to an example implementation of the disclosed technology.

FIG. 6. depicts a sensor assembly 600 in which the piezo element may be part of a fully packaged and self contained press detection sensor. FIG. 6 illustrates a vertical cross section of an example three dimensional sensor assembly 600 with the z dimension oriented vertically on the page. In the x-y plane, the sensor assembly 600 and its internal elements may be rectangular (as in FIG. 4), but may also have any shape including but not limited to round, donut, etc.

As shown in this example embodiment, the force spreading 502 and mask 504 layers are shown on a top portion of the piezo element. In an example implementation, the piezo element may be connected to conducting pads 604 on the printed circuit board (PCB) 606 using conductive adhesive 602. In an example implementation, the PCB 606 may include circuit components 608 comprising a measurement circuit similar to circuit 200 as shown in FIG. 2. In certain example implementations of the disclosed technology, the above-referenced elements may be set into a protective housing 610. In one example implementation the housing 610 may be a custom injection-molded plastic part. Cavities in the housing 610 may be configured to receive circuit components 608, for example, on the bottom surface of the PCB 606 to allow the PCB 606 to sit flat. In an example implementation, the underside of the housing 610 may have a rigid force reception plate 612 similar to the force spreading layer 502 on the top of the assembly. In another example implementation, the housing 610 may be made rigid enough to receive and distribute forces without the reception plate 612.

For increasing reliability in adverse environments, the top edge of the housing 610 may be sealed with a substantially flexible caulk or other silicone sealant. The sealant could be introduced during assembly of all parts into the case so that it fills the interstitial space between components, or it may be applied in a bead at between the top lip of the case and the lateral edges of the top force spreading layer.

Not shown in FIG. 6 are wires, which may include at least power, ground, and signal wires. In one example implementation, these wires could enter through a slot in the side of the housing 610, and soldered to pads on the underside of the PCB.

Figure 7:
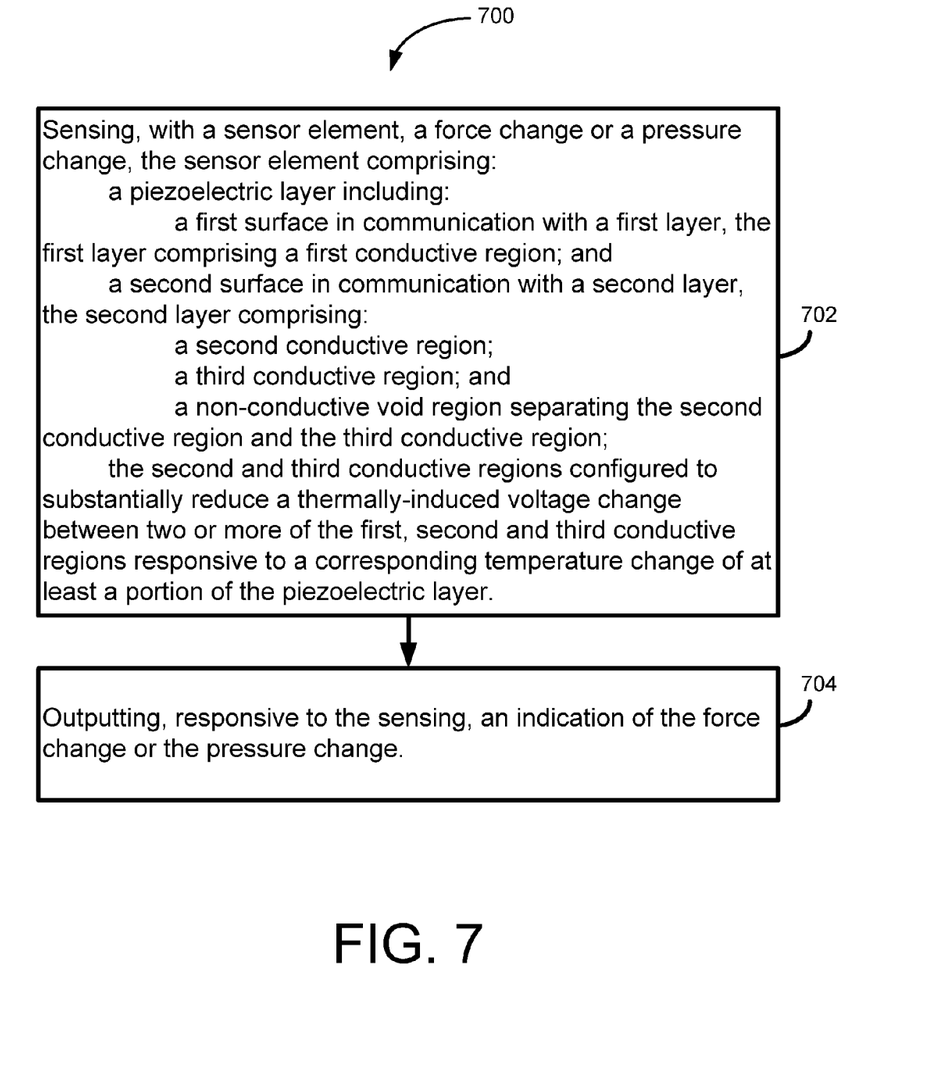
FIG. 7 is a method 700, according to an example implementation of the disclosed technology.

FIG. 7 is a method 700, according to an example implementation of the disclosed technology. In step 702, the method 700 may include sensing, with a sensor element, a force change and/or a pressure change, the sensor element comprising: a piezoelectric layer including: a first surface in communication with a first layer, the first layer comprising a first conductive region; and a second surface in communication with a second layer, the second layer comprising: a second conductive region; a third conductive region; and a non-conductive void region separating the second conductive region and the third conductive region; the second and third conductive regions configured to substantially reduce a thermally-induced response between two or more of the first, second and third conductive regions responsive to a corresponding temperature change of at least a portion of the piezoelectric layer. In step 704, the method 700 may include outputting, responsive to the sensing, an indication of the force change or the pressure change.

According to certain example implementations of the disclosed technology, the force and/or pressure change detected by the sensor element may be converted to a measurable indication and/or signal for output, as discussed above with reference to FIG. 2. For example, a charge separation on the piezoelectric layer 301 may be induced by mechanical stimuli (such as a force or pressure change) and such charge separation may, in turn, induce a current in a circuit connected to both sides of the piezoelectric layer 301. According to certain example implementations of the disclosed technology, the induced current may be utilized as an input to one or more electronics circuits, where it may be converted (for example, to a voltage), amplified, conditioned, filtered, rectified, measured, etc, and utilized for producing an output indication or signal. Other electronic circuits known to those having skill in the art may be utilized without departing from the scope of the disclosed embodiments.

In an example implementation of the disclosed technology, the second conductive region 304 is an inner region, and wherein the third conductive region 306 is an outer region that at least partially circumscribes the second conductive region 304.

In an example implementation, the piezoelectric layer 301 is configured to produce a measurable voltage differential 340, 350, 360 between two or more of the first 305, second 304 and third conductive regions 306 responsive to a corresponding force change or pressure change exerted on the first surface 310 or the second surface 330. In one example implementation, the first conductive region 305 substantially covers the first surface 310.

According to an example implementation, one or more of the first 305, second 304 and third conductive regions 306 comprise a conductive material layer in intimate contact with the piezoelectric layer 301. In certain example embodiments, the conductive material may be an organic material, a polymer, a metal, a transparent conductive metal-oxide, graphene, carbon nanotubes (CNT), metal nanorods, metal particles, or metal oxide particles, or a mixture thereof. In an example implementation, one or more of the first 305, second 304 and third conductive regions 306 comprise a conductive adhesive in intimate contact with the piezoelectric layer 301.

Certain example implementations may further include a force spreading layer 502; a mask layer 504 in communication with at least a portion of the force spreading layer 502; and a piezoelectric element 320 in communication with at least a portion of the mask layer 504.

According to example implementations, certain technical effects can be provided, such as creating certain systems and methods that provide a force and/or pressure sensor that has a reduced thermal response. Example implementations of the disclosed technology can provide the further technical effects of providing systems and methods for reducing the size and/or cost associated with manufacturing a force and/or pressure sensor.

Throughout the specification and the claims, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A sensor element comprising:
a piezoelectric layer including:
a first surface in communication with a first layer, the first layer comprising a first conductive region, wherein the first conductive region substantially covers the first surface; and
a second surface in communication with a second layer, the second layer comprising:
a second conductive region;
a third conductive region, wherein an area of the third conductive region is configured in size relative to an area of the second conductive region; and
a non-conductive void region separating the second conductive region and the third conductive region;
the respective areas of the second and third conductive regions configured to substantially reduce a thermally-induced voltage change between two or more of the first, second and third conductive regions responsive to a corresponding temperature change of at least a portion of the piezoelectric layer.

2. The sensor element of claim 1, wherein the second conductive region is an inner region, and wherein the third conductive region is an outer region that at least partially circumscribes the second conductive region.

3. The sensor element of claim 1, wherein the piezoelectric layer is configured to produce a measurable voltage differential between two or more of the first, second and third conductive regions responsive to a corresponding force change or pressure change exerted on the first surface or the second surface.

4. The sensor element of claim 1, wherein one or more of the first, second and third conductive regions comprise a conductive material in intimate contact with the piezoelectric layer.

5. The sensor element of claim 4, wherein the conductive material comprises one or more of organic material, a polymer, a metal, a transparent conductive metal-oxide, graphene, carbon nanotubes (CNT), metal nanorods, metal particles, or metal oxide particles, or a mixture thereof.

6. The sensor element of claim 1, wherein one or more of the first, second and third conductive regions comprise a conductive adhesive in intimate contact with the piezoelectric layer.

7. A sensor system comprising:
a force spreading layer;
a mask layer in communication with at least a portion of the force spreading layer; and
a piezoelectric element in communication with at least a portion of the mask layer, the piezoelectric element comprising:
a piezoelectric layer including:
a first surface in communication with a first layer, the first layer comprising a first conductive region, wherein the first conductive region substantially covers the first surface; and
a second surface in communication with a second layer, the second layer comprising:
a second conductive region;
a third conductive region, wherein an area of the third conductive region is configured in size relative to an area of the second conductive region; and
a non-conductive void region separating the second conductive region and the third conductive region;
the respective areas of the second and third conductive regions configured to substantially reduce a thermally-induced voltage change between two or more of the first, second and third conductive regions responsive to a corresponding temperature change of at least a portion of the piezoelectric layer.

8. The sensor system of claim 7, further comprising a rigid surface in communication with at least a portion of the second layer of the piezoelectric element.

9. The sensor system of claim 7, wherein the second conductive region is an inner region, and wherein the third conductive region is an outer region that at least partially circumscribes the second conductive region.

10. The sensor system of claim 7, wherein the piezoelectric layer is configured to produce a measurable voltage differential between two or more of the first, second and third conductive regions responsive to a corresponding force change or pressure change exerted on the first surface or the second surface.

11. The sensor system of claim 7, wherein one or more of the first, second and third conductive regions comprise a conductive material in intimate contact with the piezoelectric layer.

12. The sensor system of claim 11, wherein the conductive material comprises one or more of organic material, a polymer, a metal, a transparent conductive metal-oxide, graphene, carbon nanotubes (CNT), metal nanorods, metal particles, or metal oxide particles, or a mixture thereof.

13. The sensor system of claim 7, wherein one or more of the first, second and third conductive regions comprise a conductive adhesive in intimate contact with the piezoelectric layer.

14. The sensor system of claim 7, further comprising a printed circuit board in electrical communication with one or more of the first, second and third conductive regions.

15. A method comprising:
sensing, with a sensor element, a force change or a pressure change, the sensor element comprising:
a piezoelectric layer including:
a first surface in communication with a first layer, the first layer comprising a first conductive region, wherein the first conductive region substantially covers the first surface; and
a second surface in communication with a second layer, the second layer comprising:
a second conductive region;
a third conductive region, wherein an area of the third conductive region is configured in size relative to an area of the second conductive region; and
a non-conductive void region separating the second conductive region and the third conductive region;
the respective areas of the second and third conductive regions configured to substantially reduce a thermally-induced voltage change between two or more of the first, second and third conductive regions responsive to a corresponding temperature change of at least a portion of the piezoelectric layer; and
outputting, responsive to the sensing, an indication of the force change or the pressure change.

16. The method of claim 15, wherein the second conductive region is an inner region, and wherein the third conductive region is an outer region that at least partially circumscribes the second conductive region.

17. The method of claim 15, wherein the piezoelectric layer is configured to produce a measurable voltage differential between two or more of the first, second and third conductive regions responsive to a corresponding force change or pressure change exerted on the first surface or the second surface.

18. The method of claim 15, wherein one or more of the first, second and third conductive regions comprise a conductive material in intimate contact with the piezoelectric layer, and wherein the conductive material comprises one or more of organic material, a polymer, a metal, a transparent conductive metal-oxide, graphene, carbon nanotubes (CNT), metal nanorods, metal particles, or metal oxide particles, or a mixture thereof.

19. The method of claim 15, wherein one or more of the first, second and third conductive regions comprise a conductive adhesive in intimate contact with the piezoelectric layer.

20. The method of claim 15, wherein the indication of the force change or the pressure change comprises a voltage signal or a current signal.

* * * * *